United States Patent
Yamashita

(10) Patent No.: US 6,622,303 B1
(45) Date of Patent: Sep. 16, 2003

(54) DIGITAL BROADCAST TRANSMITTING METHOD AND DIGITAL BROADCAST TRANSMITTING APPARATUS

(75) Inventor: Masami Yamashita, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/505,596

(22) Filed: Feb. 16, 2000

(30) Foreign Application Priority Data

Feb. 19, 1999 (JP) .......................................... P11-041709

(51) Int. Cl.⁷ .......................... H04N 7/20; H04N 7/167; H04N 7/173
(52) U.S. Cl. ............................ 725/66; 725/31; 725/70; 725/122; 725/119
(58) Field of Search ............................ 725/63, 66, 67, 725/119, 122, 31, 104, 144, 146, 82, 71; 380/290; 455/7, 12.1, 13.2, 427, 428

(56) References Cited

U.S. PATENT DOCUMENTS

| | | | | |
|---|---|---|---|---|
| 4,751,732 A | * | 6/1988 | Kamitake | 380/230 |
| 5,151,782 A | * | 9/1992 | Ferraro | 725/122 |
| 5,420,866 A | * | 5/1995 | Wasilewski | 370/426 |
| 5,559,548 A | * | 9/1996 | Davis et al. | 725/40 |
| 5,619,501 A | * | 4/1997 | Tamer et al. | 370/392 |
| 5,870,474 A | * | 2/1999 | Wasilewski et al. | 380/211 |
| 5,917,537 A | * | 6/1999 | Lightfoot et al. | 725/4 |
| 5,920,626 A | * | 7/1999 | Durden et al. | 725/63 |
| 5,923,642 A | * | 7/1999 | Young | 725/67 |
| 6,040,850 A | * | 3/2000 | Un et al. | 725/66 |
| 6,266,813 B1 | * | 7/2001 | Ihara | 725/36 |
| 6,480,551 B1 | * | 11/2002 | Ohishi et al. | 725/71 |

FOREIGN PATENT DOCUMENTS

WO  WO 9843426 A1 * 10/1998 ............ H04N/7/16

* cited by examiner

Primary Examiner—John Miller
Assistant Examiner—Scott Beliveau
(74) Attorney, Agent, or Firm—Lerner, David, Littenberg, Krumholz & Mentlik, LLP

(57) ABSTRACT

A digital broadcast transmitting method and an apparatus for repeating and transmitting a digital broadcast program are disclosed. The method comprises transmitting individual information from a first to a second digital broadcast transmitter, wherein the second digital broadcast transmitter selects particular information from the individual information. The selected information is transmitted to a receiving terminal which stores contract data corresponding to the selected information. In addition, the first digital broadcast transmitter supplies common information necessary for descrambling the broadcast program. The scrambled broadcast program received at the receiving terminal may be descrambled utilizing a descramble key corresponding to the common information depending on the stored contract data. The apparatus comprises a first and second digital broadcast transmitter and a receiving terminal which are capable of repeating and transmitting digital broadcasts.

12 Claims, 6 Drawing Sheets

*Fig.* 5
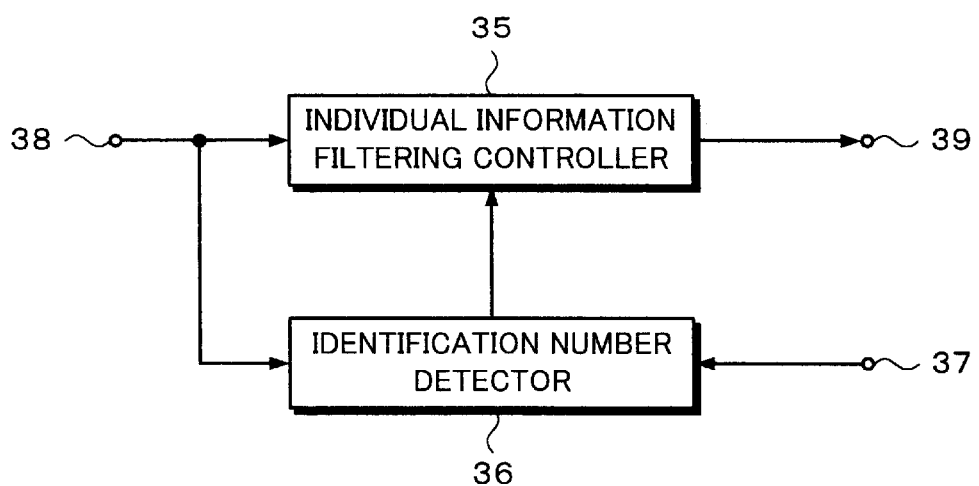

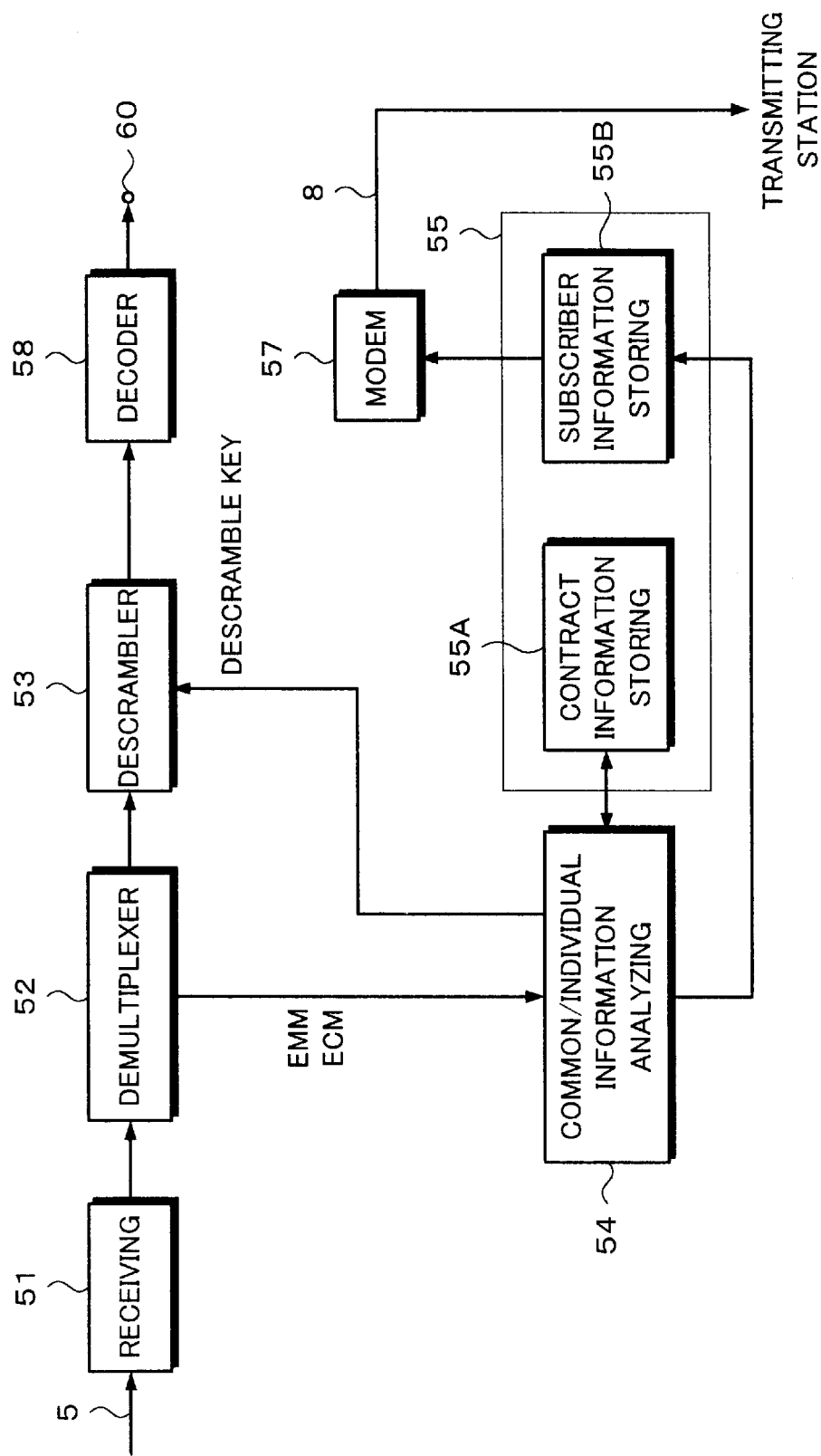

DIGITAL BROADCAST TRANSMITTING METHOD AND DIGITAL BROADCAST TRANSMITTING APPARATUS

BACKGROUND OF THE INVENTION

1. Field of the Invention

The present invention relates to a digital broadcast transmitting method and a digital broadcast transmitting apparatus suitable for a system that repeats a digital satellite broadcast program with a digital CATV (community Antenna Television).

2. Description of the Related Art

An analog CATV often receives and repeats satellite broadcast programs as CATV programs. When a satellite broadcast program is repeated and delivered as an analog CATV channel program, a video signal and an audio signal are demodulated from a satellite broadcast signal. The demodulated video and audio signals are modulated with a predetermined carrier. The modulated signal is transmitted as a CATV program signal.

A digital CATV is being developed as a successor of the analog CATV. At present, instead of analog satellite broadcasts, digital satellite broadcasts are becoming common. Thus, with the digital CATV, digital satellite broadcast programs are received and delivered.

In both the digital CATV and digital satellite broadcast, data is transmitted with a stream corresponding to MPEG (Moving Picture Experts Group) 2. In other words, both the digital CATV and digital satellite broadcast use the same encoding method. Thus, when the digital CATV delivers a digital satellite broadcast signal, it is not necessary to decode video data and audio data. Instead, only the conversion of the modulating method is required.

In other words, in the digital CATV, a digital video signal is compressed corresponding to MPEG2 and modulated corresponding to for example QAM (Quadrature Amplitude Modulation). The modulated signal is transmitted with a predetermined carrier through a cable. On the other hand, in the digital satellite broadcast, a digital video signal is compressed corresponding to for example MPEG2 and modulated corresponding to for example QPSK (Quadrature Phase Shift keying). The modulated signal is transmitted with a 12 GHz band radio wave through a satellite.

Thus, although the digital CATV and the digital satellite broadcast use the same encoding method that is MPEG2, they use different modulating methods. Consequently, when a signal that has been demodulated corresponding to QPSK is modulated corresponding to QAM, a digital satellite broadcast program can be delivered with a digital CATV.

When a digital satellite broadcast program is delivered with a digital CATV, only the conversion of the modulating method is required. However, when the modulating method of a digital satellite broadcast program is converted and the converted program is delivered with a digital CATV, the management company of the digital CATV will have difficulties for managing subscription contracts and charging operations thereof.

In other words, when a person wants to subscribe to a CATV program, he or she should make a subscription contract with the management company of the CATV broadcast. The management company will manage a subscription contract with the person and a charging operation thereof. To manage the subscription contracts and charging operations, the digital CATV system should perform scrambling operations so that only subscribers can receive CATV programs. Thus, in addition to the conversion of the modulating method, the digital CATV system should scramble a received digital satellite broadcast signal corresponding to suscription contracts for subscribers and transmit the scrambled signal to the subscribers.

Thus, when the management company of the CATV manages subscription contracts and charging operations thereof, it should perform the scrambling operations in addition to the conversion of the modulating method. Consequently, the processes performed on the digital CATV system side become complicated. Thus, the cost of the system becomes high.

SUMMARY OF THE INVENTION

Therefore, an object of the present invention is to provide a digital broadcast transmitting method and a digital broadcast transmitting apparatus that allow a digital CATV system that repeats and delivers a digital satellite broadcast program to manage subscription contracts and charging operations in a simple structure at low cost.

A first aspect of the present invention is a digital broadcast transmitting method of a system having a first digital broadcast transmitter for supplying a broadcast program, a second digital broadcast transmitter for repeating and transmitting the broadcast program received from the first digital broadcast transmitter, and a receiving terminal for receiving the broadcast program from the second digital broadcast transmitter and reproducing the received broadcast program. The method compriser the steps of (a) transmitting individual information from a first digital broadcast transmitter to a second digital broadcast transmitter, (b) selecting particular individual information from the individual information received at the second digital broadcast transmitter and transmitting the selected individual information to a receiving terminal, (c) storing contract data corresponding to the particular individual information when it is assigned at the receiving terminal, (d) transmitting common information necessary for descrambling the broadcast program when it is scrambled and transmitted, (e) transmitting the scrambled broadcast program and the common information from the second digital broadcast transmitter to the receiving terminal, and descrambling the scrambled broadcast program using a descramble key corresponding to the common information when the contract data stored in the receiving terminal allows the descrambled broadcast program to be descrambled. terminal, (c) causing the receiving terminal to store contract data corresponding to the particular individual information when it is assigned to the receiving terminal, (d) causing the first digital broadcast transmitting means to transmit common information necessary for descrambling the broadcast program when it is scrambled and transmitted, (e) causing the second digital broadcast transmitting means to transmit the scrambled broadcast program and the common information to the receiving terminal, and (f) causing the receiving terminal to obtain a descramble key corresponding to the common information and descramble the scrambled broadcast program only when the contract data stored in the receiving terminal allows the descrambled broadcast program to be descrambled.

A second aspect of the present invention is a digital broadcast transmitting apparatus for repeating and transmitting a digital broadcast program to a receiving terminal. The digital broadcast transmitting apparatus comprises a receiver receiving the digital broadcast program, a demodulator for demodulating digital data of a signal received by the receiver, an individual information selector for selecting particular individual information from individual information of digital data that is output from the demodulator a manager for managing individual information selected by the individual information selector and a modulator for modulating delivery data. The CATV management company has a group of identification numbers.

The CATV management company has a group of identificatin numbers. When a digital satellite broadcast program is repeated and delivered with a digital CATV broadcast, one of identification numbers is assigned to each subscriber of the digital CATV. In the digital CATV broadcast, only EMM (Entitlement management message) information of the identification numbers belonging to subcribers are filtered and transmitted. Thus, without need to dispose a scrambling circuit on the digital CATV system side, the management company of the digital CATV system can manage subscription channels and charging operations thereof.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 5 is a block diagram showing an example of the structure of an individual information filtering circuit; and FIG. 6 is a block diagram of a set top box of a receiving terminal of the television broadcast transmitting system according to the present invention.

DETAILED DESCRIPTION OF THE PREFERRED EMBODIMENTS

Figure 1:
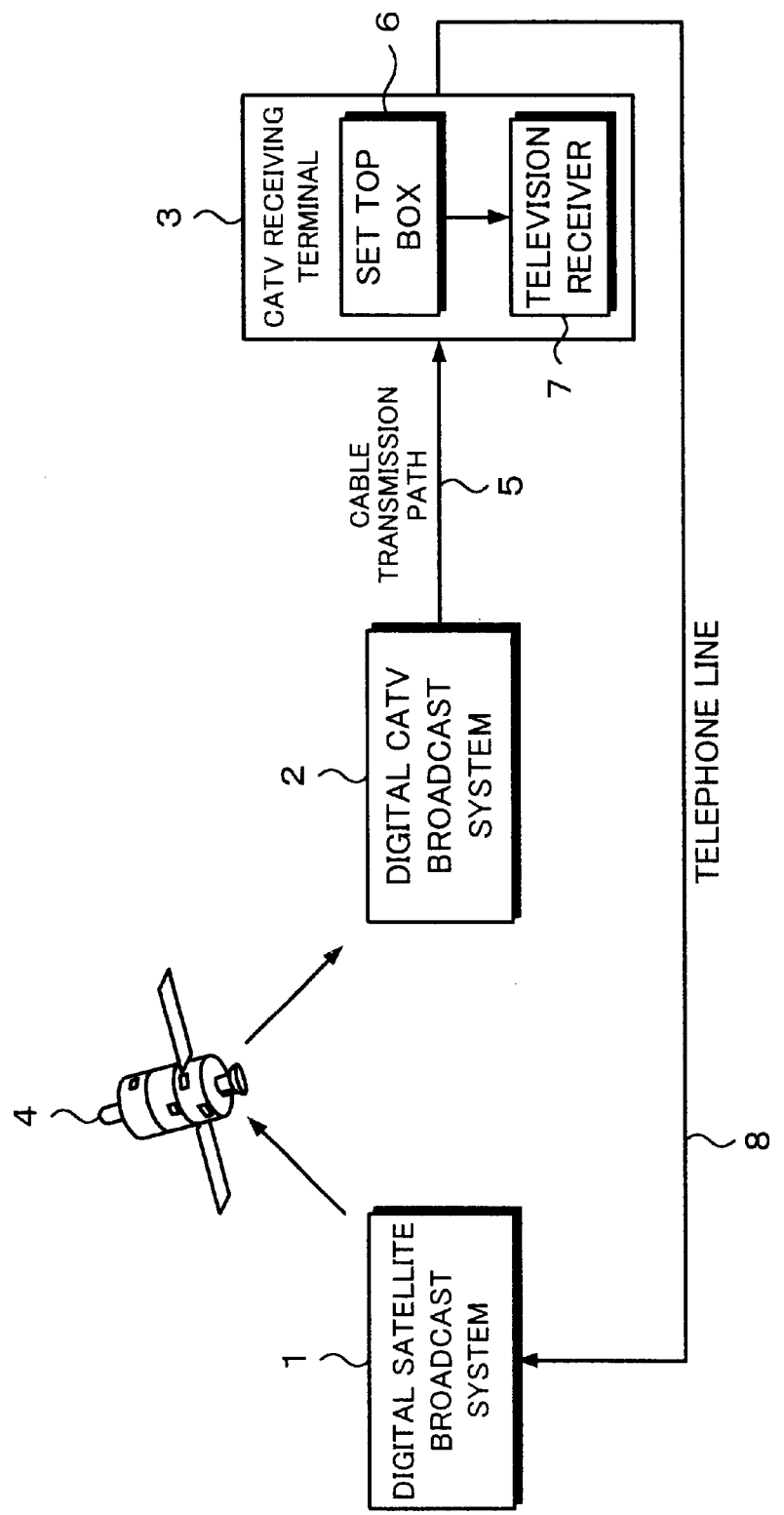
FIG. 1 is a block diagram of a television broadcast transmitting system according to the present invention.

Next, with reference to the accompanying drawings, an embodiment of the present invention will be described. FIG. 1 is a schematic diagram showing the overall structure of a system according to the present invention.

In FIG. 1, reference numeral 1 is a digital satellite broadcast system. The digital satellite broadcast system 1 broadcasts digital satellite broadcast programs through a satellite 4 on as many as several hundred channels. Some channels of programs that are broadcast by the digital satellite broadcast system 1 are pay channels. Two methods for charging subcribers are flat contract and PPV (Pay Per View) contract. In the flat contract, each subscriber is charged for a designated channel in the unit for a predetermined period. In the PPV contract, each subscriber is charged for each program. The pay channel programs are scrambled so that only PPV contracted subscribers can receive them.

The digital satellite broadcast system 1 transmits data corresponding to MPEG2. In other words, video data and audio data are compressed, encoded, packetized, and placed in a transport stream. The resultant stream is modulated corresponding to QPSK method and transmitted with a 12 GHz band radio wave.

The transport stream contains additional information along with video data and audio data. The additional information includes NIT (Network Information Table), CAT (Condition Access Table), PAT (Program Association Table), and PMT (Program Map Table).

NIT contains a channel list. CAT contains EMM (Entitlement Management Message) information. PAT contains channel information of each carrier. PMT contains components of each channel and ECM (Encryption Control Message) necessary for descrambling data. EMM information represents encrypted contract data for each subscriber. ECM information is an encrypted descramble key corresponding to each channel or each component.

A signal that is transmitted from the digital satellite broadcast system 1 through the was satellite 4 and is received by each home via a digital CATV broadcast system 2. The digital CATV broadcast system 2 receives the signal containing the transport stream from the digital satellite broadcast system 1 through the satellite 4 and performs a repeating process for delivering programs to subscribers through a cable transmission path 5.

In addition to repeating programs transmitted from the digital satellite broadcast system 1, the digital CATV broadcast system 2 also broadcasts original programs and repeats ground broadcast programs. Moreover, the digital CATV broadcast system 2 can repeat programs transmitted from a plurality of satellite broadcast systems.

The digital CATV broadcast system 2 uses MPEG2 as a compressing method. In addition, the digital CATV broadcast system 2 uses, for example, QAM as a modulating method. On the other hand, the digital satellite broadcast system 1 uses, for example, MPEG2 as a compressing method. In addition, the digital satellite broadcast system 1 uses, for example, QPSK as a modulating method. Thus, although the digital CATV system and the digital satellite broadcast system use the same compressing method, they use different modulating methods. Consequently, the digital CATV broadcast system 2 performs a process for converting QPSK into QAM.

In addition, the digital CATV broadcast system 2 according to the present invention performs an EMM information selecting process so as to manage suscription contracts and charging operations thereof.

Figure 2:
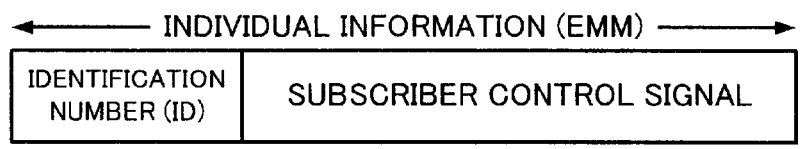
FIG. 2 is a schematic diagram explaining EMM information.

As described above, a transport stream transmitted from the digital satellite broadcast system 1 contains EMM information as individual information. As shown in FIG. 2, the EMM information is composed of an identification number and a subscriber control signal. The identification number is a unique number assigned to each subscriber of the digital CATV broadcast system 2 from a group of identification numbers is used for the digital CATV broadcast system 2. When a person makes a subscription contract with the management company of the digital CATV broadcast system 2, the management company assigns one of identification numbers from the group to the subscriber. An IC card with the assigned identification number is used.

When the digital CATV broadcast system 2 repeats a broadcast program transmitted from the digital satellite broadcast system 1 through the satellite 4, the digital CATV broadcast system 2 converts the modulating method from QPSK to QAM. In addition, the digital CATV broadcast system 2 determines whether or not the identification number of the EMM information matches one of identification numbers of the group used for the digital CATV broadcast system 2. When the identification number of the EMM information matches one of identification numbers of the group, the digital CATV broadcast system 2 causes the EMM information to pass.

CATV receiving terminal 3 (FIG. 1) is composed of a set top box 6 and a television receiver 7 that are disposed in the home of each subscriber of the digital CATV system 2.

A digital signal is transmitted from the digital CATV system 2 through the cable transmission path 5. The signal is received by the set top box 6. The set top box 6 performs a QAM demodulating process and an MPEG2 decoding process. Thus, a video signal and an audio signal are decoded from the digital signal transmitted through the cable transmission path 5. The video signal and the audio signal that have been decoded by the set top box 6 are supplied to and displayed on the television receiver 7.

The set top box 6 is provided with an IC card the card stores the identification number of the subscriber. The set top box 6 receives the EMM information and compares the identification number of the EMM information with the identification number stored in the IC card. When they match, the set top box 6 determines that the received EMM information is EMM information addressed to the subscriber, the set top box 6 supplies the received EMM information to the IC card. Contract data is obtained from the subscriber control signal of the EMM information and stored to the IC card.

Some programs transmitted from the digital satellite broadcast system 1 through the CATV broadcast system 2 are pay channel programs. The pay channel programs have been scrambled. To allow the subscriber to watch a pay channel program, the ECM information of the channel is received and is sent to the IC card.

The IC card has stored contract data corresponding to the EMM information. Only when the contract data allows the scrambled program to be descrambled, a descramble key is generated corresponding to the EMM information. The descramble key is set to a descrambler. Thus, the pay channel program is descrambled. Consequently, the subscriber can watch the pay channel program. The subscriber information is stored on the IC card and transmitted to the digital satellite broadcast, system 1 through a telephone line 8.

As described above, only when the identification number of the EMM information is one of identification numbers of the digital CATV broadcast system identification number group, the digital CATV system 2 allows the EMM information to pass. Only when a person makes a subscription contract with the management company of the digital CATV system 2, he or she obtains one of identification numbers of the group. Thus, only a person who has contracted with the management company of the digital CATV system 2 can receive EMM information addressed to him/her. The contract data is written to the IC card. Corresponding to the contract data, a scrambled pay channel program signal can be descrambled.

Figure 3:
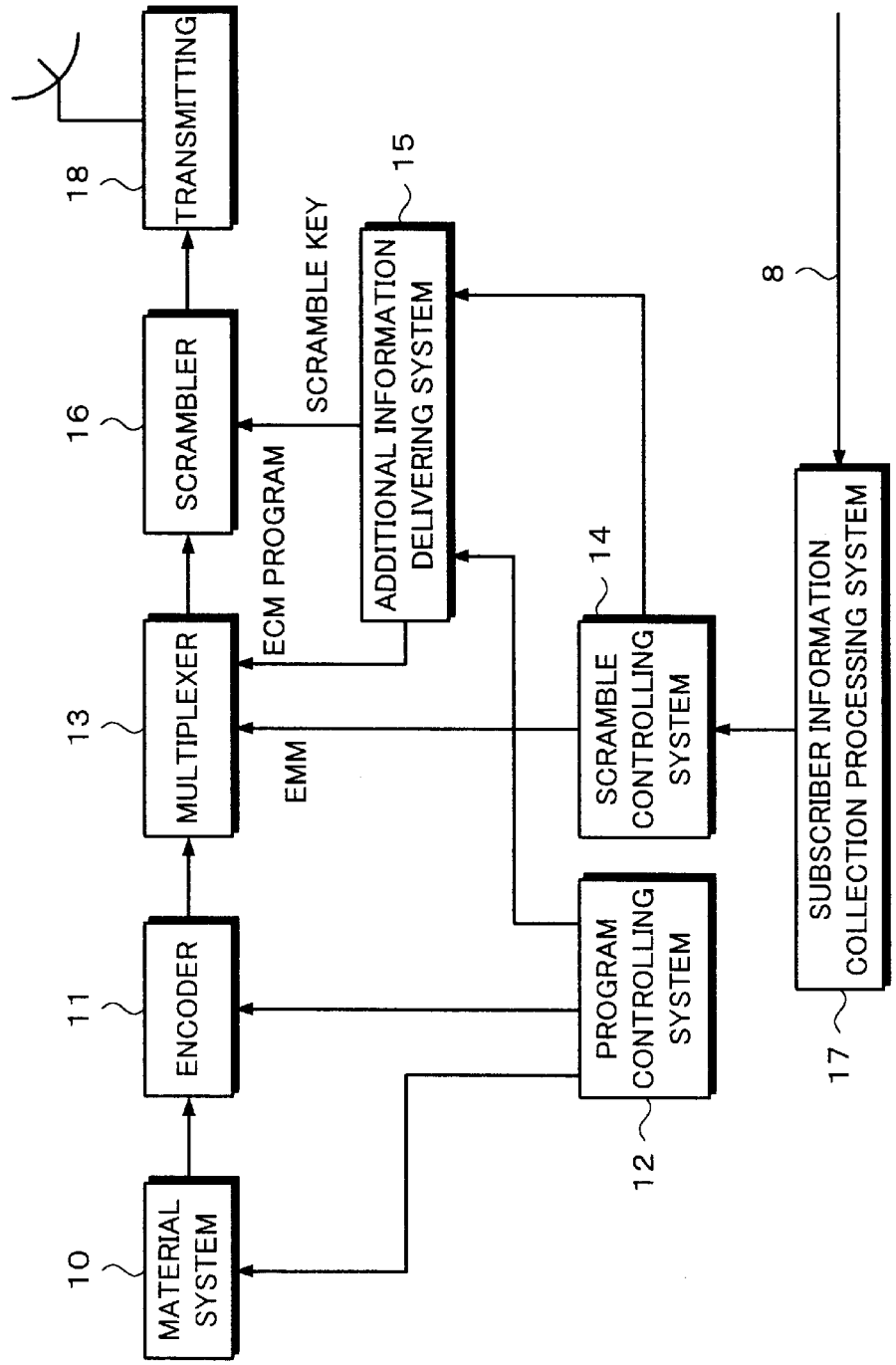
FIG. 3 is a block diagram of a digital satellite broadcast transmitting system of the television broadcast transmitting system according to the present invention.

FIG. 3 is a block diagram showing an example of the structure of the digital satellite broadcast system 1. A material processing system 10, for example VCR collects video information and audio information as program materials.

Under the control of a program controlling system 12, the material processing system 10 supplies a video signal and an audio signal as materials of a program to an encoder 11. The encoder 11 performs a compression-encoding process, for example MPEG2 for the video signal and the audio signal. The video data compressed by the encoder 11 and the audio signal are supplied to a multiplexer 13.

The multiplexer 13 multiplexes various types of information with the video data and the audio data that have been compression-encoded by the encoder 11 time division basis and generates a transport stream.

The transport stream contains a channel list, EMM information, channel information of each carrier, and service information such as ECM information. As previously discussed, subscriber information is stored on the IC card and transmitted to the digital satellite broadcast system 1 via the telephone line 8. The subscriber information is received by the digital satellite broadcast system 1 via the subscriber information collection processing system 17. The EMM information is generated by a scramble controlling system 14 corresponding to an output signal of a subscriber information collection processing system 17 and supplied to the multiplexer 13. The channel list, channel information, and ECM information are generated by an additional information delivering system 15 corresponding to program information received from the program controlling system 12. The service information is multiplexed by the multiplexer 13.

A scramble key is generated by the additional information delivering system 15 corresponding to a work key received from the scramble controlling system 14. Corresponding to the scramble key, delivery data is scrambled. At this point, since the additional information including EMM information and ECM information should be required on the receiver side, they are not scrambled.

An output signal of the scrambler 16 is supplied to a transmitting circuit 18. The transmitting circuit 18 performs an error correction code encoding process for the delivery data, modulates the resultant data corresponding to QPSK, and transmits the resultant signal with a carrier at a predetermined frequency to a satellite.

The subscriber information collection processing system 17 manages contract information and subscription information of subscribers of the digital satellite broadcast system 1. The subscriber information collection processing system 17 receiver the subscriber information through the telephone line 8. When a new contract is made or a contract is changed, the subscriber information collection processing system 17 sends the contract information to the scramble controlling system 14. Corresponding to the contract information, the scramble controlling system 14 outputs EMM information to the multiplexer 13.

At this point, when a person is a subscriber of a program of a digital satellite broadcast system 1 using the digital CATV system 2, EMM information of one of the identification numbers of the digital CATV system identification number group is used.

When the digital satellite broadcast system 1 broadcasts a pay channel program, the scramble controlling system 14 sends a work key to the additional information delivering system 15. The additional information delivering system 15 encrypts a scramble key with the work key and outputs the resultant scramble key as part of ECM information.

Figure 4:
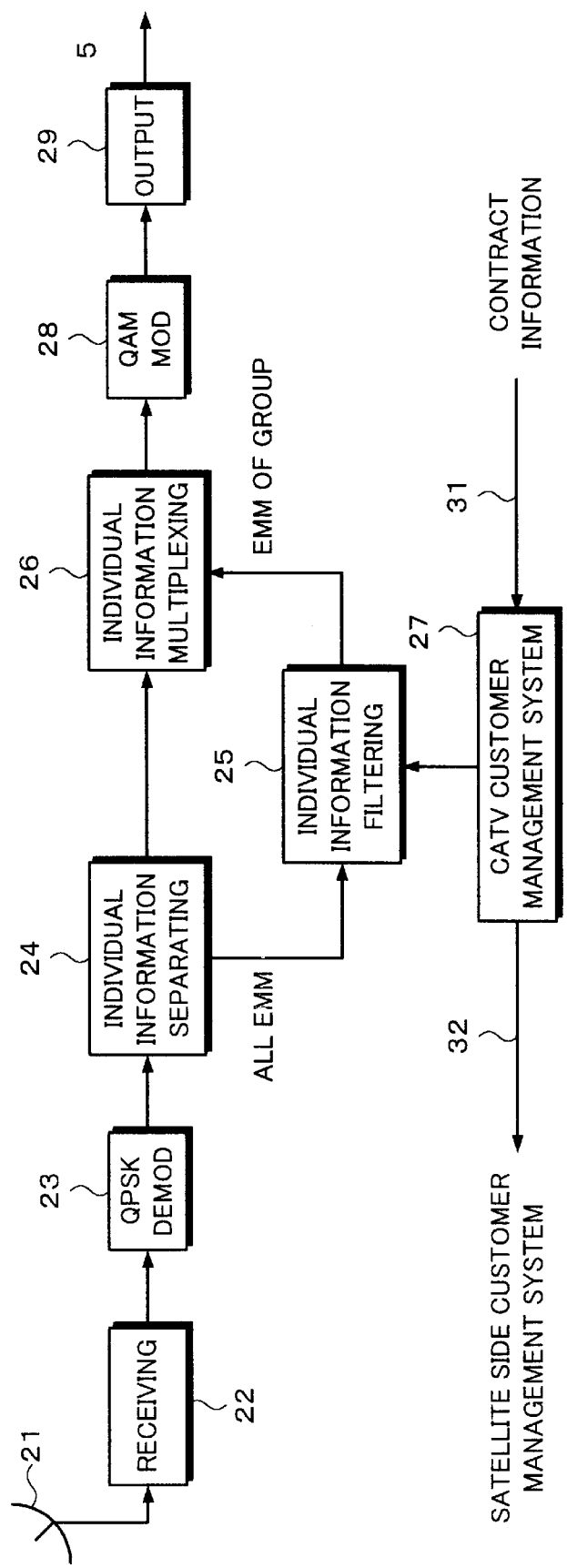
FIG. 4 is a block diagram of a digital CATV broadcast transmitting system of the television broadcast transmitting system according to the present invention.

FIG. 4 shows the structure of the digital CATV system 2. In FIG. 4, a parabola antenna 21 receives a signal from a digital satellite broadcast system 1 through a satellite 4 (FIG. 1). The signal received by the parabola antenna 21 is supplied to a receiving circuit 22 through an LNB (not shown).

The receiving circuit 22 selects a signal with a desired carrier frequency from the received signal and supplies the selected signal to a QPSK demodulator 23. The QPSK demodulator 23 performs a QPSK demodulating process for the output signal of the receiving circuit 22 and supplies the output signal of the QPSK demodulator 23 to an individual information separating circuit 24.

The individual information separating circuit 24 separates EMM information from the transport stream received from the QPSK demodulator 23. All EMM information separated by the individual information separating circuit 24 is supplied to an individual information filtering circuit 25.

The individual information filtering circuit 25 extracts EMM information of one of identification numbers of the digital CATV broadcast system identification number group from all the EMM information.

As was described above, when a person wants to subscribe to a digital satellite broadcast program transmitted through the digital CATV broadcast system 2, he or she makes a subscription contract with the management company of the digital CATV broadcast system 2. The contract information is transmitted to a CATV customer management system 27 through an information line 31.

When the CATV customer management system 27 receives the contract information, the CATV customer management system 27 assigns one of identification numbers of the digital CATV broadcast system identification number group to the person as a subscriber. The CATV customer management system 27 transmits the contract information of the person to the subscriber information collection processing system 17 of the digital satellite broadcast system 1 through an information line 32. In addition, the CATV customer management system 27 sends one of identification numbers to the individual information filtering circuit 25.

An output signal of the individual information filtering circuit 25 is supplied to an individual information multiplexing circuit 26. The individual information multiplexing circuit 26 adds EMM information that contains the assigned identification number and that is extracted by the individual information filtering circuit 25 to the stream.

An output signal of the individual information multiplexing circuit 26 is supplied to a QAM modulating circuit 28. The QAM modulating circuit modulates transmission data corresponding to QAM. An output signal of the QAM modulating circuit 28 is supplied to an output circuit 29 transmitted to a CATV receiving terminal 3 at each home.

FIG. 5 shows an example of the structure of the individual information filtering circuit 25 shown in FIG. 4. An, identification number is supplied from the CATV customer management system 27 to an input terminal 37. In addition, all EMM information is supplied from the individual information separating circuit 24 to an input terminal 38. An identification number detector 36 compares the identification number of the EMM information separated by the individual information separating circuit 24 with identification numbers of the digital CATV broadcast system identification number group to determine whether or not there is a match. Corresponding to an output signal of the identification number detector 36, an individual information filtering controller 35 is controlled. Only when a match is detected, the individual information filtering controller 35 outputs the information through an output terminal 39. Thus, only EMM information of an identification number of the digital CATV broadcast system identification number group has is extracted and output.

FIG. 6 shows the structure of the set top box 6 of the CATV receiving terminal 3 disposed at each home. In FIG. 6, a signal transmitted from the digital CATV broadcast system 2 through the cable transmission path 5 is supplied to a receiving circuit 51. The receiving circuit 51 receives the signal with a desired carrier performs a QAM demodulating process and an error correcting process for the received signal.

The output signal of the receiving circuit 51 is supplied to a demultiplexer 52. The demultiplexer 52 separates packets of video data, audio data, and additional information. The separated packets of video data and the audio data are supplied to a descrambler 53. EMM information and ECM information of the additional information are supplied to a common/individual information analyzing portion 54.

A contract information storing portion 55A of an IC card stores a unique identification number of the subscriber. The information stored in the IC card 55 is supplied to the common/individual information analyzing portion 54. The common/individual information analyzing portion 54 compares the identification number of the received EMM information with the identification number stored in the IC card 55. When EMM information containing an identification number matching the identification number stored in the IC card 55 is received, the EMM information is treated as EMM information transmitted to the subscriber. Thus, the EMM information is sent to the IC card 55. Contract information obtained from the subscriber control signal contained in the EMM information is stored to the contract information storing portion 55A of the IC card 55.

When the subscriber watches a pay channel program, the common/individual information analyzing portion 54 receives ECM information of the channel and supplies the ECM information to the IC card 55.

Contract information corresponding to the EMM information has been stored in the contract information storing portion 55A of the IC card 55. The contract information determines whether or not a received pay channel should be descrambled. When the descrambling operation of the pay channel program is permitted, a descramble key is generated corresponding to the ECM information. The descramble key is sent to the descrambler 53. At this point, subscriber history information is supplied to a subscriber information storing portion 55B of the IC card 55. The subscriber history information stored in the subscriber information storing portion 55B is transmitted to the subscriber information collection processing system 17 of the digital satellite broadcast system 1 through a telephone line 8 by a modem 57.

When the descrambler key is sent to the descrambler 53, the descrambler 53 descrambles the pay channel program signal. An output signal of the descrambler 53 is supplied to a decoder 58 to decode the video data and audio data. The decoded video data and audio data are converted into analog signals which are supplied to the television receiver 7 through an output terminal 60.

Thus, according to the present invention, when a person wants to watch a digital satellite broadcast program that is transmitted through a digital CATV broadcast system, he or she makes a subscription contract with the management company of the digital CATV broadcast system 2 for the program. The management company assigns one of identification numbers of a digital CATV broadcast system identification number group to the person as a subscriber. Thus, the management company of the digital CATV system 2 can manage pay channel programs and charging operations thereof for each subscriber of the digital CATV system 2. The digital CATV broadcast system 2 converts the modulating method from QPSK to QAM and filters EMM information of the digital CATV broadcast system identification number group. Thus, extra processes and apparatuses are not required.

In the above-described example, the digital CATV broadcast system 2 filters identification numbers of a group that the management company has. Alternatively, when the digital CATV broadcast system 2 filters each of identification numbers, it can permit each receiving terminal to receive each pay channel program or prohibit each receiving terminal from receiving each pay channel program.

In other embodiments, the present invention can be applied to the case in which a digital ground wave broadcast is repeated by a digital CATV and the case in which a digital satellite broadcast signal is repeated with a digital ground wave broadcast as well as the case in which a digital satellite broadcast is repeated with a digital CATV.

According to the present invention, when a digital satellite broadcast program is repeated with a digital CATV broadcast, one of identification numbers of a digital CATV broadcast system identification number group is assigned to each subscriber thereof. In the digital CATV broadcast, only EMM information of identification numbers of the group that the management company of the digital CATV broadcast system has is filtered and transmitted. Thus, the management company of the digital CATV system can manage pay channel programs and charging operations thereof for each subscriber thereof without need to provide the digital CATV system with a scrambling circuit.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A method for digitally broadcasting a broadcast program comprising:

receiving a signal from a digital broadcast transmitter, the signal including individual information, the broadcast program and, when the broadcast program is scrambled, common information necessary for descrambling the broadcast program;

selecting particular individual information from the individual information and, when the particular individual information corresponds to a portion of identification information of a group, transmitting the particular individual information to a receiving terminal; and transmitting the scrambled broadcast program and the common information from the digital broadcast transmitter to the receiving terminal so that the receiving terminal descrambles the scrambled broadcast program using a descramble key corresponding to the common information when contract data stored in the receiving terminal allows the scrambled broadcast program to be descrambled.

2. The digital broadcast method as set forth in claim 1, further comprising:

receiving the contract data from the receiving terminal, the contract data corresponding to the particular individual information; and assigning the portion of the identification information of the group to a particular individual.

3. The digital broadcasting method as set forth in claim 2, wherein the step of transmitting the particular individual information includes transmitting the particular individual information to the receiving terminal so that the receiving terminal independently determines whether to receive the scrambled broadcast program.

4. The digital broadcasting method as set forth in claim 1, wherein the digital broadcast transmitter transmits digital satellite broadcasts.

5. The digital broadcasting method as set forth in claim 1, wherein the step of transmitting the scrambled broadcast program transmits digital CATV broadcasts.

6. A method for digitally broadcasting a broadcast program comprising:

storing contract data at a receiving terminal, the contract data corresponding to a particular individual when the contract data is assigned;

receiving the contract data at a first digital broadcast transmitter and at a second digital broadcast transmitter;

assigning a portion of identification information of a group to the particular individual at the second digital broadcast transmitter;

transmitting a signal from the first digital broadcast transmitter to the second digital broadcast transmitter, the signal including individual information, the broadcast program and, when the broadcast program is scrambled, common information necessary for descrambling the broadcast program;

selecting particular individual information from the individual information received at the second digital broadcast transmitter and, when the particular individual information corresponds to the portion of the identification information of the group, transmitting the particular individual information to the receiving terminal;

transmitting the scrambled broadcast program and the common information from the second digital broadcast transmitter to the receiving terminal; and descrambling the scrambled broadcast program at the receiving terminal using a descramble key corresponding to the common information when the contract data stored in the receiving terminal allows the scrambled broadcast program to be descrambled.

7. The digital broadcast method as set forth in claim 1, wherein the step of transmitting the selected individual information includes:

transmitting the particular individual information to the receiving terminal so that the receiving terminal independently determines whether to receive the scrambled broadcast program.

8. The digital broadcast method as set forth in claim 1, wherein the first digital broadcast transmitter transmits digital satellite broadcasts.

9. The digital broadcast method as set forth in claim 1, wherein the second digital broadcast transmitter transmits digital CATV broadcasts.

10. An apparatus for repeating and transmitting a digital broadcast program to a receiving terminal, comprising:

a manager adapted to assign a portion of identification information of a group to a particular individual;

a receiver adapted to receive a signal that includes the digital broadcast program and individual information;

a demodulator adapted to demodulate digital data from the signal received by said receiver;

a separator adapted to separate the individual information from the demodulated digital data that is output from said demodulator;

an individual information selector adapted to select particular individual information from the individual information that is output from said separator and to output the particular individual information when the particular individual information corresponds to the portion of the identification information of the group;

a multiplexer adapted to combine the particular individual information with a remaining portion of the demodulated digital data;

a modulator adapted to modulate output of said multiplexer as delivery data; and an output circuit adapted to transmit the delivery data to a receiving terminal.

11. The apparatus as set forth in claim 10, wherein the received digital broadcast program is a digital satellite broadcast program.

12. The apparatus as set forth in claim 10, wherein the delivery data includes a digital CATV program.

* * * * *

UNITED STATES PATENT AND TRADEMARK OFFICE
CERTIFICATE OF CORRECTION

PATENT NO.    : 6,622,303 B1
DATED         : September 16, 2003
INVENTOR(S)   : Masami Yamashita It is certified that error appears in the above-identified patent and that said Letters Patent is hereby corrected as shown below:

Column 2,
Line 48, delete "terminal, (c) causing the receiving terminal to".
Lines 49-61, delete the entire lines.
Line 65, after the word "receiver", insert the word -- for --.

Column 3,
Line 3, after the word "demodulator", add a comma -- , --.
Line 5, after the word "selector", add a comma -- , --.
Line 6, delete the words "The CATY management company".
Line 7, delete the entire line.
Line 13, change "management message" to -- Management Message --.

Column 4,
Line 14, after the word "signal", delete the word "that".
Line 15, after the word "the", delete the word "was".
Line 52, delete the words "is used for" and in place thereof insert
-- by the management company of --.

Column 5,
Line 3, insert the word -- A -- before the word "CATV".
Line 15, delete the words "the card" and in place thereof insert the word -- that --.
Line 31, after the word "and", delete the word "is".
Line 57, after the word "example", add a comma -- , --.
Line 57, after the word "VCR", add a comma -- , --.
Line 63, after the word "MPEG2", add a comma -- , --.

Column 6,
Line 1, after the number "11", insert the word -- on --.
Line 37, delete the word "receiver" and in place thereof insert -- receives --.

Column 7,
Line 42, after the word "An", delete the comma ",".
Line 46, after the number "38.", start a new paragraph.
Line 59, at the beginning of the line, delete the word "has".
Line 65, after the word "carrier", insert the word -- and --.

UNITED STATES PATENT AND TRADEMARK OFFICE
CERTIFICATE OF CORRECTION

PATENT NO. : 6,622,303 B1
DATED : September 16, 2003
INVENTOR(S) : Masami Yamashita It is certified that error appears in the above-identified patent and that said Letters Patent is hereby corrected as shown below:

Column 10,
Line 39, 47 and 50, delete the number "1" and in place thereof insert the number -- 6 --.

Signed and Sealed this

Twenty-seventh Day of January, 2004

JON W. DUDAS
*Acting Director of the United States Patent and Trademark Office*